June 18, 1935. H. VAN DRESSER Re. 19,617

WINDOW GUARD

Original Filed Aug. 20, 1931 3 Sheets-Sheet 1

Inventor

H. Van Dresser

By Clarence A. O'Brien

Attorney

June 18, 1935. H. VAN DRESSER Re. 19,617

WINDOW GUARD

Original Filed Aug. 20, 1931 3 Sheets-Sheet 2

Inventor
H. Van Dresser

By Clarence A. O'Brien
Attorney

June 18, 1935. H. VAN DRESSER Re. 19,617

WINDOW GUARD

Original Filed Aug. 20, 1931 3 Sheets-Sheet 3

INVENTOR:

Huntington van Dresser.

Reissued June 18, 1935 Re. 19,617

UNITED STATES PATENT OFFICE 19,617

WINDOW GUARD

Huntington van Dresser, Memphis, Tenn., assignor to William van Dresser, Lincolnton, N. C.

Original No. 1,873,229, dated August 23, 1932, Serial No. 558,372, August 20, 1931. Application for reissue May 23, 1934, Serial No. 727,170

6 Claims. (Cl. 20—71)

This invention relates to a window guard, the general object of the invention being to provide a guard for an open window for preventing entrance through the window opening when the window is raised and also preventing lowering of the window, with means for locking the guard in position but so that an authorized person with a key can quickly release and remove the guard for the purpose of escaping from a building through the window opening.

The invention also consists in certain other features of construction and in the combination and arrangement of the several parts to be hereinafter fully described, illustrated in the accompanying drawings and specifically pointed out in the appended claims.

In describing the invention in detail reference will be had to the accompanying drawings wherein like characters denote like or corresponding parts throughout the several views in which:—

Figure 1:
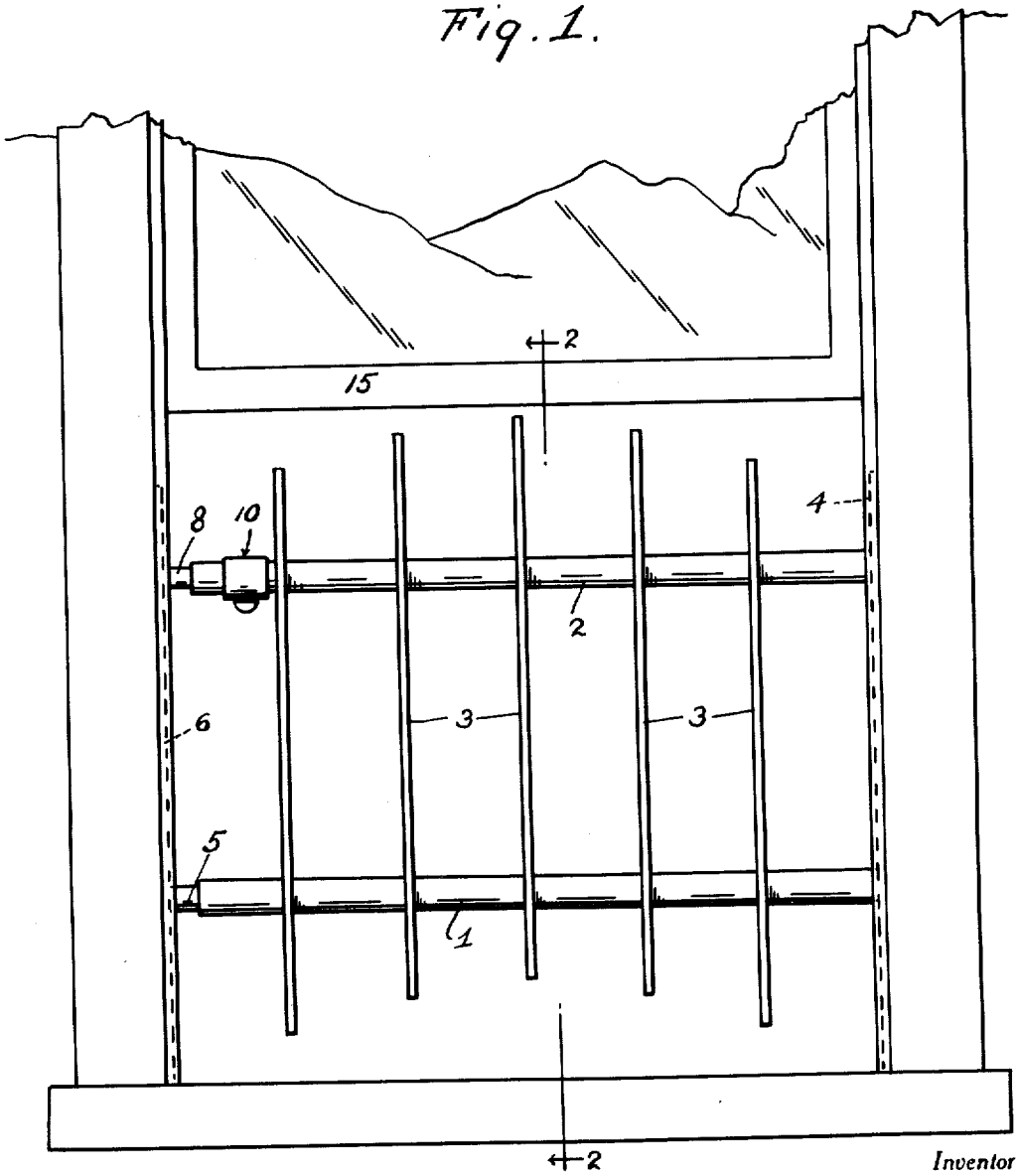
Figure 1 is a view of the exterior of a window showing the invention in use.

In the said views the numerals 1 and 2 indicate a pair of pipes to which the spaced bars 3 are attached by welding or the like. A plate 4 carries a pair of plain bolts or studs 16 and 17 for entering the pipes 1 and 2 at one end of the device, and a plate 6 carries a plain bolt or stud 5 and a threaded bolt or stud 8 for entering the pipes at the other end of the device.

Figure 2:
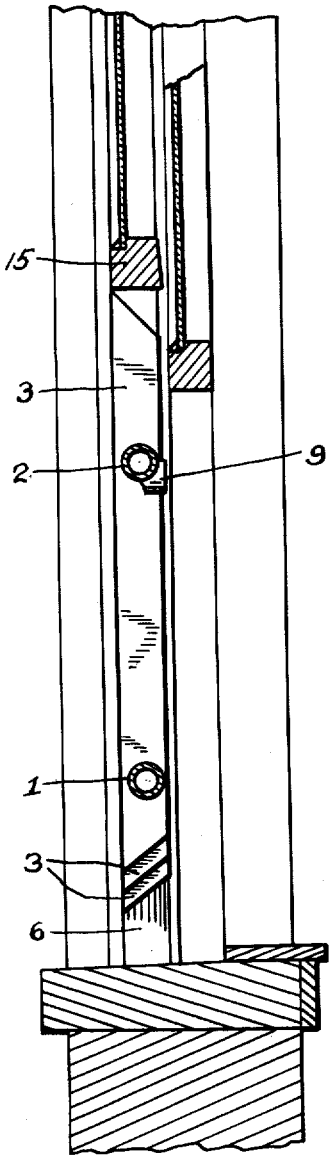
Figure 2 is a section on line 2—2 of Figure 1.

The plates 4 and 6 are adapted to be placed in the guides in the side stiles of the window frame, the said guides being those complementary to the upper and outermost sash as shown in Figures 1 and 2. With the studs or bolts disposed in the ends of the pipes as shown, the device will be held across the opening in the window frame when the sash is raised, and the device, therefore, will prevent any one entering the window and will also prevent lowering of the upper and outermost sash.

Figure 6:
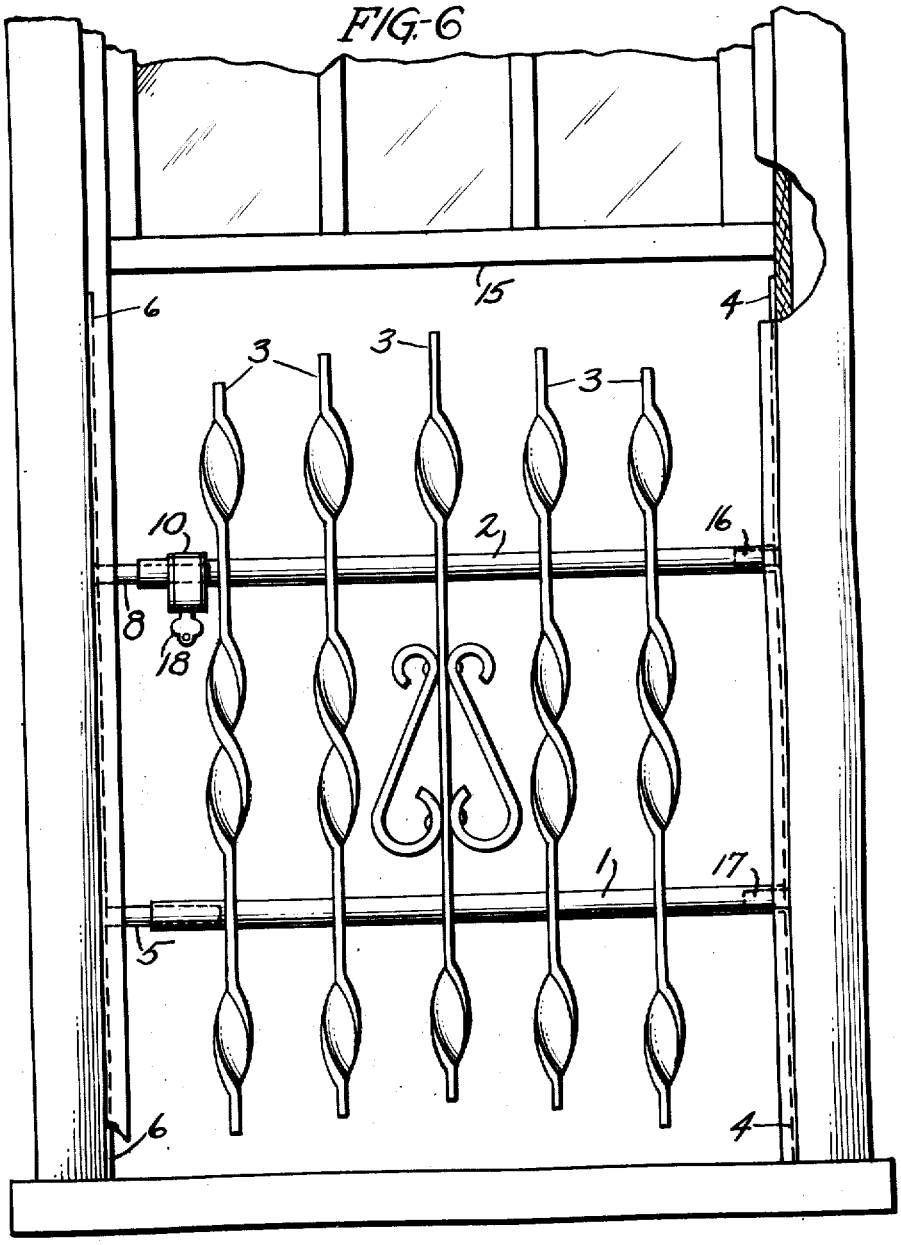
Figure 6 is a view, partly in front elevation and partly in section, showing a guard of modified type.

Manifestly when the bolts or studs 5 and 8 are free to move endwise in the pipes 1 and 2 at one end of the device, the device can be readily positioned in the window frame, after which the plate or bar 6 is moved outwardly until it enters the sash guides of the window frame at which time the parts are in the positions shown in Figures 1 and 6.

Figure 3:
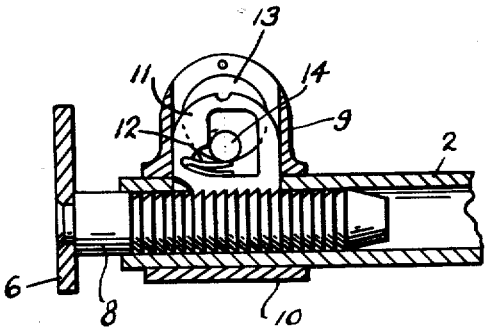
Figure 3 is a view mainly in section showing the locking means.
Figure 4:
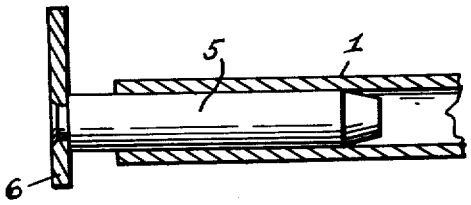
Figure 4 is a sectional detail view showing one of the plain members fitting in its place.
Figure 5:
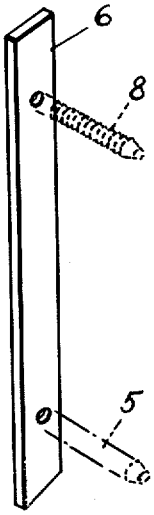
Figure 5 is a perspective of the bar which carries a plain member and a threaded member.

In order to lock the device in the position indicated, I provide a lock casing 9 on that end of the pipe 2 which receives the threaded bolt 8. Said casing 9 has a sleeve 10 which encircles the pipe 2 and is welded or otherwise fastened thereto. A bolt plate 11 is slidably arranged in the casing 9 and is formed with teeth on its inner edge for engaging the teeth of the bolt 8 and said teeth are so formed that the bolt and plate can be moved outwardly but cannot be moved inwardly. A spring 12 normally holds the bolt plate 11 in engagement with the teeth of the bolt 8, and the casing 9 carries a locking barrel 13 having a crank 14 thereon which enters an opening in the plate 11 so that turning movement of the barrel will cause the crank to move the plate 11 out of contact with the bolt 8 to permit the device to be moved from the window frame. The barrel is operated by the usual key, and as shown in Figures 1, 2 and 6 the casing which carries the keyhole is directed downwardly so as to prevent rain or moisture entering the lock through the keyhole. In Figure 3 the casing 9 is, for facility of illustration, shown as extending upwardly from the pipe 2, but the working arrangement of the said casing 9 will be readily understood from Figures 1, 2 and 6.

Manifestly when the parts of a lock are in the position shown in Figure 3, and the plates 4 and 6 are positioned in the guides of the upper and outermost sash, as shown in Figures 1 and 6, the upper sash will prevent material upward movement of the device, and the device will be locked against an outsider seeking to gain entrance through the window opening. When, however, the barrel 13 is turned by a key in the possession of an inmate of the house to cause the member 14 to retract the plate 11 out of engagement with the bolt 8, the plate 6 may be moved toward the adjacent end of the pipes 1 and 2 and the device removed from the window frame. From this it follows that notwithstanding the effective locking of the device in working position it may be readily removed by a person in possession of the complementary key as when it is necessary for such person to escape from the house through the window opening. Obviously, the plate 6 can be moved outwardly as in positioning the device in a window frame without operation of the lock through the medium of its complementary key.

The disposition of the casing 9 as illustrated in Figures 1, 2 and 6 will prevent moisture from entering the lock through the keyhole, and this without interfering with the ready introduction of the key into the keyhole of the lock.

The teeth on the bolt 8 and those on the plate 11 are so cut as to allow variation or adjustment of approximately one-sixteenth ($\frac{1}{16}$) of an inch in the movement of the bolt 8 so that the plate 6 can be so positioned in the sash guides as to hold the guard rigidly in position.

The guard is supported by the lower ends of the plates 4 and 6 resting on the sill of the window, and material upward movement of the guard is prevented by the sash above and in vertical alignment with the guard, and there are no screws or the like used in the holding of the device in the window frame.

The key complementary to the lock is shown in Figures 6 and designated by 18, and in said Figure 6 the upper and outermost sash of the window is designated by 15.

It will be apparent from the foregoing that my novel device can be readily shifted from one window to another, and that the device is adapted to be used in windows or window frames of varying widths.

It will also be apparent that when my device is arranged in the manner described in a window frame, the device may be depended upon to bar burglars inasmuch as it will be impossible to remove the device from the window frame without the making of considerable noise calculated to awaken a sleeper and to attract the notice of passing persons.

It is to be understood that changes may be made in the construction and in the combination and arrangement of the several parts, provided that such changes fall within the scope of my appended claims.

Having thus described my invention, what I claim as new is:—

1. A device of the class described comprising a number of tubular members, spaced bars supported by the members, a pair of plates for engaging sash guides in the window, and lugs carried by the plates for entering the ends of the tubular members, and means for locking one of the tubular members to one of said lugs.

2. A device of the class described comprising a number of tubular members, spaced bars supported by the members, a pair of plates for engaging sash guides in the window, lugs carried by the plates for entering the ends of the tubular members, means for locking one of the tubular members to one of said lugs, said means consisting of teeth on the lug, and a lock casing having a sliding plate therein formed with teeth for engaging the teeth of the lug, and manually operated means for retracting the sliding plate.

3. A device of the class described comprising a number of tubular members, spaced bars supported by the members, a pair of plates for engaging sash guides in the window, lugs carried by the plates for entering the ends of the tubular members, means for locking one of the tubular members to one of said lugs, said means consisting of teeth on the lug, a lock casing having a sliding plate therein formed with teeth for engaging the teeth of the lug, and manually operated means for retracting the sliding plate, the teeth being so arranged as to permit the lug to move outwardly in relation to the tubular member and prevent inward movement of the lug in the tubular member.

4. In a device for guarding a window, guard means adapted to occupy a window opening and rest at one vertical edge in a vertical sash guide in one side stile of a window frame, a plate arranged alongside the opposite vertical edge of the guard means and movable toward and from the same for disposition in a vertical sash guide in the opposite side stile of the window frame, and key controlled locking means complementary to the guard means and said plate for normally preventing inward movement of said plate while permitting outward movement thereof, said means including a socket provided in the last-named vertical edge of the guard means, a toothed lug on the plate and sheathed in said socket, a lock casing on the guard means having a slidable plate therein formed with teeth for engaging the teeth of the lug, and key controlled means for retracting the slidable plate, the teeth being arranged to permit the lug to move outward relatively to the guard means and prevent inward movement of the lug.

5. In a device for guarding a window, guard means adapted to occupy a window opening and rest at one vertical edge in a vertical sash guide in one side stile of a window frame, a plate arranged alongside the opposite vertical edge of the guard means and movable toward and from the same for disposition in a vertical sash guide in the opposite side stile of the window frame, and key controlled locking means complementary to the guard means and said plate for normally preventing inward movement of said plate while permitting outward movement thereof, said means including a socket provided in the last-named vertical edge of the guard means, a toothed lug on the plate and sheathed in said socket, a lock casing on the guard means having a slidable plate therein formed with teeth for engaging the teeth of the lug, and key controlled means for retracting the slidable plate, the teeth being arranged to permit the lug to move outward relatively to the guard means and prevent inward movement of the lug, and the lock casing having a pendent portion and a keyhole in the lower end thereof.

6. In a device for guarding a window, guard means adapted to occupy a window opening and rest at one vertical edge in a vertical sash guide in one side stile of a window frame, a plate arranged alongside the opposite vertical edge of the guard means and adjustable toward and from the same for disposition in a vertical sash guide in the opposite side stile of the window frame, and key controlled locking means complementary to the guard means and said plate for normally preventing inward movement of said plate while permitting outward movement thereof, said means comprising a toothed element on the plate, and a toothed element on the guard means and opposed to the first-named toothed element, the teeth of said elements arranged to normally permit outward movement of the plate and prevent inward movement thereof.

HUNTINGTON VAN DRESSER.